Patented Feb. 26, 1935

1,992,308

UNITED STATES PATENT OFFICE 1,992,308

CHEMICAL TREATMENT OF HYDROCARBON OILS

Edgar W. Hultman, Los Angeles, Calif., assignor to Hultman and Powell Corporation, Dover, Del., a corporation of Delaware No Drawing. Application September 5, 1929, Serial No. 390,657

17 Claims. (Cl. 196—42)

The present invention relates to purifying and improving mineral oil materials such as gasoline, kerosene, lubricating oils, hydrocarbon mixtures and the like, and is applicable to oils which are particularly difficult of treatment such as cracked gasolines, even those having high sulphur content and high content of unsaturated hydrocarbons. The process comprises first producing a treated electrolyte carrying one or more strongly oxidizing substances, then contacting this with the oil under treatment, whereby there usually is produced the purified or partly purified oil, and a residue of the electrolyte (or in some cases a sludge) from the reagent employed, which itself is capable of being further treated to regenerate the treating reagent. This may be done as a batch process or cyclic process.

Sulphuric acid has been used as the preferred treating chemical, for many years, in purifying all kinds of mineral oil materials, this being used in varying concentrations, usually well above 80 per cent, and frequently oleum has been employed. In accordance with the practice of the art, the treatment of cracked gasoline with a strong sulphuric acid has not given entirely satisfactory results, for the reason that the unsaturated components of the cracked gasolines are, to a considerable extent, polymerized into resinous or asphaltic bodies, or in some cases become chemically combined with the sulphuric acid and thus pass into the sludge and are lost.

In the old art, the treatment of cracked gasoline of high sulphur content, such as cracked gasoline produced from Pacific coast crudes, requires acid of very high concentration, usually at least 66° Baumé, and leads to inordinate losses in the unsaturated constituents of the cracked gasoline.

In accordance with the present invention sulphuric acid is found to be a very satisfactory primary reagent to employ, this being used in a concentration preferably around 50 per cent strength, but stronger or weaker acid may be used. Sulphuric acid of substantially above 80 per cent strength is however not recommended, and acid of 75 per cent strength seems to be substantially better than acid of 80 per cent strength. While I have stated 50 per cent strength as the preferred concentration it will be understood that the concentration may be even substantially below this, say down to about 35 or 40 per cent strength, while giving satisfactory results. The remainder of the primary reagent will usually consist largely of water.

The sulphuric acid employed in the process is preferably activated, by electrolytic treatment, to form substantial amounts of more highly oxidizing substances, notably persulphuric acid, Caro's acid and hydrogen peroxide in the liquid, and it is preferable to convert a considerable proportion (say 40%, or even nearly 50%) of the total sulphuric acid present into these peroxidized compounds, before bringing the acid into contact with the oil under treatment. Ozone or oxygen may also be produced to a considerable extent during the electrolytic operation and this ozone may be bubbled through the oil or distillate under treatment, which will greatly assist in desulphurizing, decolorizing and sweetening the oil.

The electrolyzed acid may be mechanically mixed with oil in a suitable tower or tall treating tank, the acid being introduced at the top into the oil or distillate, the tower being provided with suitable filling bodies if desired, and provided with mechanical agitators if desired. The oil and acid may travel counter-current in the tower, or may travel in the same direction if desired.

Ordinarily in the treatment of mineral oil material with sulfuric acid by the old methods, the acid reacts with portions of the mineral oil and is itself converted into a thick very viscous pasty or semi-liquid tarry material called "sludge", and this latter separates out from the treated oil more or less completely. This material is of very little value but is sometimes worked up to recover some sulphuric acid and oil.

In the present case the electrolyzed acid may be added to the upper part of a body of the oil (stationary, moving or circulating body of oil, as desired, mechanically agitated or not as desired). Assuming the simple case of a substantially quiet body of oil, the drops of added acid sink down through the body of oil, leaving trails of bubbles and foam, particularly in the upper part of the tank. The drops of acid become colored and gradually darken in color, frequently to a brownish or sometimes even black color, and collect in the bottom of the tank. The collected liquid is not like the ordinary acid sludge of the old process, but is a thin readily flowable liquid, which is then drawn off or pumped off to the electrolytic cells for reactivation.

In cases where vigorous mechanical agitation is maintained, or in other cases if desired, the acid leaving the treating tank may pass through a separating tank (the tank containing the oil under treatment) to settle the acid liquid out of the oil, which settling will occur promptly. This is because the spent acid is a thin liquid instead of a thick viscous to pasty sludge.

The acid residue formed in my treatment and settled out at the bottom of the tower or other treating receptacle, can be drawn off into the electrolytic cell above referred to, for regenerating the electrolyte above mentioned, the electric current also destroying the organic matter present therein.

The process, in its preferred form, is cyclic. The acid flows through the electrolytic cell to become activated, then through the oil, and then back to the cell. The oil may be as a batch or may circulate through the treating tower or receptacle counter-current to the treated electrolyte, or in the same direction, if desired.

In a particular laboratory experiment on the above process, the electrolytic cell was constituted by a lead bottle, in which the anode was constituted by a U-shaped platinum tube through which cold water was caused to flow to keep the anode cool. The hydrogen was drawn off from the upper part of the lead bottle inside of a ceramic diaphragm, this hydrogen being kept separate from the anodic acid and gas. The capacity of the cell was about ½ liter and the ratio of cathode surface to anode surface was about 15 to 1. With this arrangement a voltage of about 7 was employed, at about 8 amperes. The outgoing anodic acid was found to contain a very large proportion of persulphuric acid, Caro's acid and hydrogen peroxide. The effluent anodic acid was brought into direct contact with cracked gasoline of rather high sulphur content, and relatively good agitation of the oil in contact with the acid was employed. With a cracked gasoline initially containing 1 per cent of sulphur the sulphur content was reduced to 0.15% in three minutes treatment, during which time the color of the distillate was reduced to normal and the oil was made normal as to odor.

In another experiment using a cracked gasoline containing 0.6 per cent of sulphur (which is quite a common sulphur content of Pacific coast cracked gasolines), the sulphur content was reduced to 0.1% in three minutes, the color similarly being reduced to normal within that period.

In all cases, the electrolyte is preferably used shortly after formation, since it is chemically an unstable material. The treated electrolyte is preferably brought into contact with the oil at or below or at not much above room temperature, otherwise the loss through decomposition will be higher.

The voltage and amperage can vary a good deal, e. g. good results have been secured with voltage from about 7 to 17, at about 5 to 15 amperes. These data are given, by way of illustration and not as restricting the invention thereto. In a particular experiment, 18 volts at 10 amperes gave good results. This corresponded to about 50 amperes per square decimeter of anode area, in the particular test.

The hydrogen evolved in the electrolytic cell is drawn off through a separate outlet pipe and can be used for any desired purpose. Any oxygen (which will be found to be largely converted into ozone) produced in the electrolytic cell is preferably conducted through a separate pipe into the lower part of the oil receptacle or mixing tower to bubble up through the oil. The total amount of persulphuric acid, Caro's acid and hydrogen peroxide in the negatively charged acid can vary within wide limits, up to nearly one-half of the total sulphuric acid. In the treatment of the oil with this electrolyte it will be seen that a lot of bubbles or foam will be formed and will be visible (most of my tests being made in glass apparatus), surrounding each drop of the electrolyte as it progresses down through the oil.

With strong sulphuric acid alone on the contrary, no bubbles or no foam would be produced. With ordinary 50% sulphuric acid, no purification would be effected. The negatively charged electrolyzed acid converts the sulphur of the oil apparently very largely into sulphur dioxide, but on account of the low concentration of the sulphuric acid, the unsaturation of the cracked gasoline is not reduced and may be somewhat increased. This was particularly noticed in the case of a cracked gasoline containing initially 16 per cent of unsaturated compounds and 1.1 per cent of sulphur (which is a high sulphur content). After the treatment with the negatively charged acid as above described, the unsaturated compounds had risen to about 18 per cent while the sulphur had dropped down to about 0.1 per cent, (which is a permissible sulphur content in many States). The odor and color of the treated gasoline were excellent, and no further treatment was necessary).

As a commercial example, 1,000 lbs. of the electrolyte (50%H$_2$SO$_4$) is circulated through a battery of say 6 electrolytic cells arranged in parallel, at the rate of 100 lbs. per minute, then into the top of a tall tank containing a batch of 1,000 barrels of cracked gasoline, the acid from the bottom of the latter going back to the cells for retreatment. This treatment should be continued until the oil is sufficiently desulphurized and purified, say 15 to 30 minutes. With a straight run gasoline (i. e. not a cracked product) the time will be very much reduced, say to 5 or 8 minutes.

The acid, in circulating through the cell and tower and settling tank will gradually increase in strength, and this may be permitted to continue until the acid reaches 90 per cent or so in concentration, but preferably water is added from time to time or continuously, to maintain about 50 per cent concentration in the acid.

The process has been described above with special reference to cracked gasoline. It is equally applicable to other mineral oil products such as kerosenes, lubricating oils and greases and mixtures such as pressure distillates, etc., the sulphuric acid electrolyte being very suitable for all of these oils.

The treatment with the electrolyte may in some cases be sufficient purification, as in the case of "Synthetic gasoline" (product of cracking by Cross process), while in other cases it is advisable to employ other treatments afterwards, such as redistillation, treatment with bleaching clay or other bleaching earth or activated carbon, treatment with alkali solutions or other chemicals, or a combination of two or more of these.

In some cases it is advisable to so conduct the process of electrolysis of the acid, that the persulphuric acid and Caro's acid have been wholly or substantially converted into hydrogen peroxide, before the step of contacting the acid electrolyte with the oil. This can be effected by control of the flow of acid through the cell, and by the use of relatively dilute acid, of say 50% instead of 75 or 80%. This has an important advantage in the use of less reagent, and less time of contact between the acid and the oil.

Various other electrolytes can be used in place of sulphuric acid, for example sodium chloride solution, which may be converted into sodium hypochlorite solution which may contain free dissolved chlorine. Other examples of solutions are mercury salts, copper salts, phosphoric acid, alkalies and various others.

The process is also applicable to the treatment of natural gas, casinghead gas, etc. This in some cases contains substantial amounts of $H_2S$ or perhaps other sulphur compounds. It may contain vapors of gasoline or other oils.

The gas can flow slowly through a treating space, say a large vertical tower or tank. The dilute sulphuric acid can be subjected to electrolysis, and the electrolyzed acid brought into contact with the gas in the treating space as indicated by spraying the acid (preferably converting it into a very fine mist) or by bubbling the gas through the acid, or by otherwise well contacting the acid with the gas. The treatment may be conducted on the counter-current principle, preferably. This treatment can be combined with known processes of recovering gasoline, etc. from the natural gas. Treatment of the gas with the electrolyte can be conducted at ordinary room temperature, or while refrigerated, and under atmospheric or superatmospheric pressure.

The above description refers to the production of purified and refined gasoline. In tests made, it has been found that by continuing the treatment of a given batch of oil for a longer period than is necessary to effect proper purification, various oxidation products such as alcohols, ketones, aldehydes, and fatty acids, and others can be formed. This latter mode of treatment is covered more particularly in a copending application Ser. No. 448,801 of April 30, 1930.

In addition to the treatment of petroleum hydrocarbons (cracked or uncracked) the invention is also applicable to the treatment of other organic products such as alcohols, (e. g. methyl, ethyl and fusel oil) fatty oils or fatty acids, drying or nondrying, essential oils, e. g. turpentine, tars, tar oils, distillates and other aromatic hydrocarbons, tan liquors, treatment of liquids to prevent fermentation, etc.

I claim:—

1. A process which comprises subjecting sulfuric acid of not substantially below 35% but below 80% concentration, to electrolysis to form therein compounds which are more strongly oxidizing than is sulfuric acid, and without any substantial delay contacting a hydrocarbon oil distillate therewith, while at not substantially above room temperature, thereby leaving an oil and an acid material, separating the two and subjecting the latter to electrolysis.

2. A process which comprises circulating a liquid electrolyte composed essentially of 35 to 80% $H_2SO_4$ in a cyclic path, and during such circulation alternately subjecting same to electrolytic oxidation and without any substantial delay contacting the electrolytically oxidized product with an oil.

3. In the refining of hydrocarbon oil distillate with an oxidizing reagent, the steps of subjecting $H_2SO_4$ of 35 to 80% strength to electrolysis and then at once contacting such distillate with said treated electrolyte, separating the products of said contacting operation into an oily product and an aqueous product, and again subjecting the aqueous product of such treatment to electrolysis.

4. In the refining of a cracked hydrocarbon oil distillate with an oxidizing reagent, the steps of subjecting $H_2SO_4$ of about 35 to 80% strength to electrolysis and then at once contacting said distillate with said treated electrolyte, separating the products of said contacting operation into an oily product and an aqueous product, and again subjecting the aqueous product of such treatment to electrolysis.

5. The process which comprises withdrawing used acid from contact with an oil and electrolysis of such acid while containing an amount of water between half and double the amount of the actual sulfuric acid therein, and continuing such electrolysis until the electrolyte contains persulfuric acid and immediately contacting such electrolyte with oil to be treated.

6. The process which comprises withdrawing used acid from contact with an oil and electrolysis of such acid while containing an amount of water at least half of the amount of the actual sulfuric acid therein but below double the said amount, whereby the acid is regenerated and made suitable for reuse in the process.

7. A process of treating petroleum oil material by contacting same with a liquid acid reagent containing a sulphur compound and having strong oxidizing properties, separating the excess of such liquid reagent and reaction products from the oil and reoxidizing such separated material by electrolysis to render the same suitable for use again in treating oil, and at once bringing this reoxidized material into contact with petroleum oil material.

8. A process which comprises subjecting an aqueous solution of sulfuric acid to electrolysis producing an aqueous liquid containing sulfuric acid and hydrogen peroxide and water, and at once treating hydrocarbon oil therewith and regenerating the acid reagent by electrolysis.

9. A process which comprises subjecting an aqueous solution of sulfuric acid to electrolysis producing an aqueous liquid containing sulfuric acid, hydrogen peroxide and water, and at once treating hydrocarbon oil therewith, drawing off the residual acid solution, again subjecting it to electrolysis and again treating hydrocarbon oil therewith.

10. A process which comprises subjecting an aqueous solution of sulfuric acid to electrolysis producing an aqueous liquid containing sulfuric acid, persulfuric acid, Caro's acid, hydrogen peroxide and water, and at once treating hydrocarbon oil therewith.

11. A process which comprises subjecting sulfuric acid of about 50% concentration, to electrolysis to form therein compounds which are more strongly oxidizing than is sulfuric acid, at once contacting a hydrocarbon oil distillate therewith, while at not substantially above room temperature, thereby leaving an oil and an acid material, separating the two and subjecting the latter to electrolysis.

12. In the refining of hydrocarbon oil distillate with an oxidizing reagent, the steps of subjecting $H_2SO_4$ of about 50% strength to electrolysis and then at once contacting said distillate therewith and again subjecting the aqueous product of such treatment to electrolysis.

13. A process which comprises subjecting an aqueous solution of sulphuric acid of about 35 to 80% strength to electrolysis, producing an aqueous liquid containing sulphuric acid and hydrogen peroxide and water, and at once treating hydrocarbon oil therewith and regenerating the acid reagent by electrolysis.

14. A process which comprises subjecting an aqueous solution of sulfuric acid of about 50% strength to electrolysis producing an aqueous liquid containing sulfuric acid and hydrogen peroxide and water, and at once treating hydrocarbon oil therewith, and regenerating the acid reagent by electrolysis.

15. A process which comprises electrolytically oxidizing sulfuric acid of about 35 to 80% strength until a reagent containing sulfuric acid, water and substantial amounts of persulfuric acid, Caro's acid and hydrogen peroxide is produced, and at once treating mineral oil material with such reagent.

16. A process which comprises electrolytically oxidizing sulfuric acid of about 50% strength until a reagent containing sulfuric acid, water and substantial amounts of persulfuric acid, Caro's acid and hydrogen peroxide is produced, and without any substantial delay treating mineral oil material with such reagent.

17. A process which comprises circulating a liquid electrolyte, initially composed essentially of sulphuric acid of about 35 to 80% strength, through a cycle and alternately in the cycle subjecting said electrolyte to anodic oxidation to form a liquid containing oxidation products of sulphuric acid, and then at once treating a hydrocarbon oil with said oxidized liquid, and repeating said cycle of steps.

EDGAR W. HULTMAN.